July 18, 1967  F. SCHÜLDE ETAL  3,331,336
PALLET
Filed March 4, 1966
3 Sheets-Sheet 1
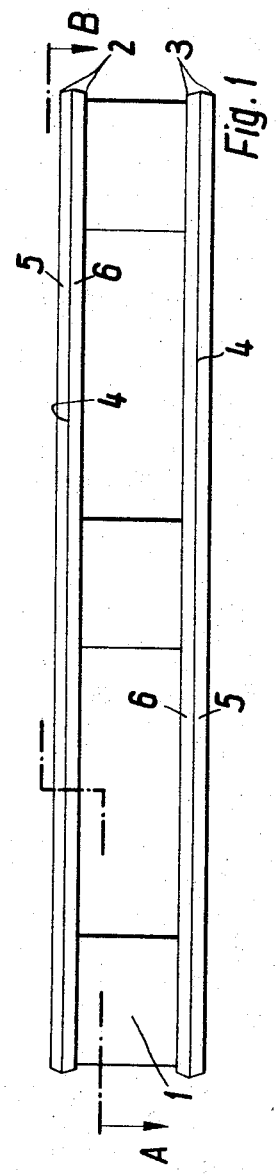
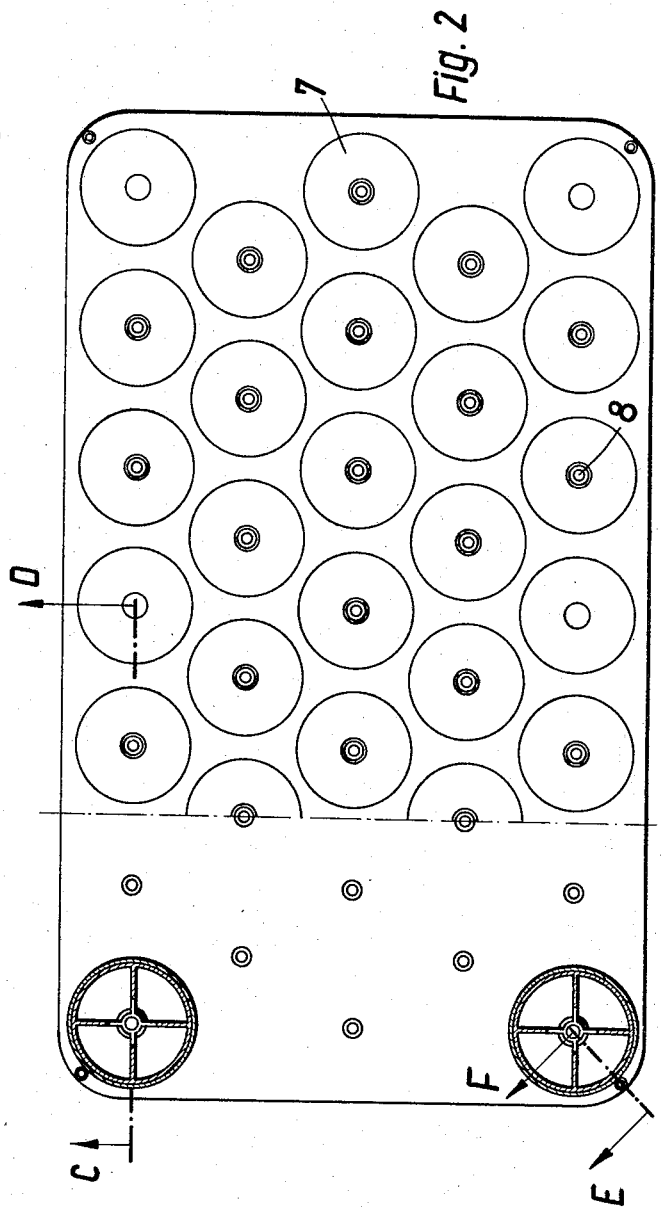
Inventors
FELIX SCHÜLDE
HANS OLLIG
REINER THEOBALD
BY Burgess, Dinklage & Sprung
ATTORNEYS.

July 18, 1967  F. SCHÜLDE ETAL  3,331,336
PALLET
Filed March 4, 1966  3 Sheets-Sheet 2
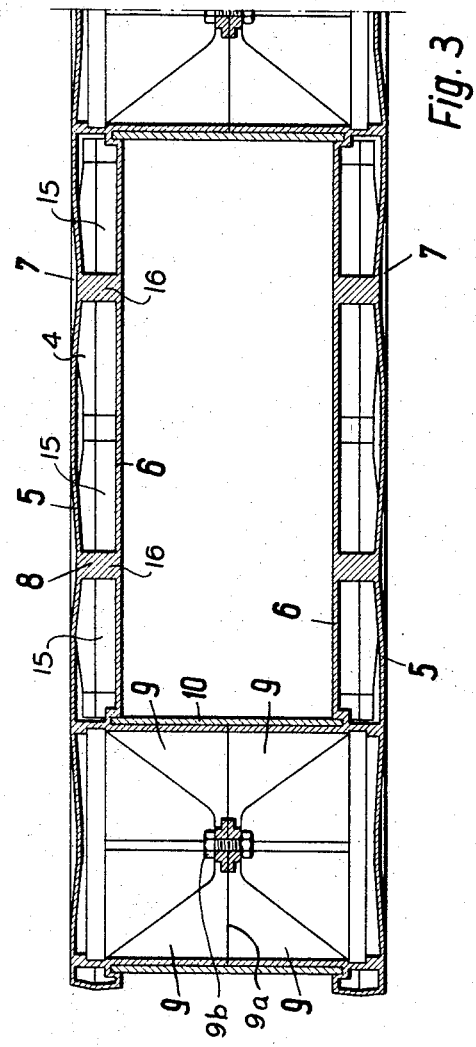
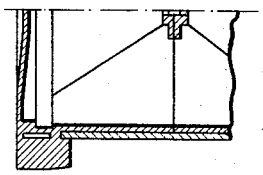
Inventors
FELIX SCHÜLDE
HANS OLLIG
REINER THEOBALD
BY Burgess, Dinklage & Sprung
ATTORNEYS.

July 18, 1967 F. SCHÜLDE ETAL 3,331,336
PALLET
Filed March 4, 1966 3 Sheets-Sheet 3

Inventors
FELIX SCHÜLDE
HANS OLLIG
REINER THEOBALD
BY
Burgess, Dinklage Sprung
ATTORNEYS.

United States Patent Office 3,331,336
Patented July 18, 1967

3,331,336
PALLET
Felix Schülde, Neuenhain, Taunus, and Hans Ollig and Reiner Theobald, Frankfurt am Main, Germany, assignors to Vereinigte Deutsche Metallwerke AG, Frankfurt am Main, Germany
Filed Mar. 4, 1966, Ser. No. 531,983
Claims priority, application Germany, Mar. 5, 1965, V 27,968; Apr. 6, 1965, V 28,214
7 Claims. (Cl. 108—57)

The invention relates to a transport element or pallet made of plastic, such as a rack for the transportation or storage of goods that can be stacked, such as bags, boxes, containers and cartons. Transport elements in the form of pallets made of plastic are in the prior art. However, it has not been possible hitherto to make a plastic transport element sufficiently stable as well as light in weight. This problem is the basis of the invention. It is solved by the fact that the transport element according to the invention is constructed of an upper and a lower layer, each layer being composed of two flat parts having a mirror-image symmetry. The two layers are coupled together by coupling elements which more or less pertain to the prior art. By the use of the so-called blowing process, however, it is also possible to manufacture both layers in one piece, which substantially reduces the cost of the manufacture of the transport element of the invention.

Embodiments of the invention are depicted in the drawings, wherein:

FIG. 1 is a side elevation of a transport element according to the invention;

FIG. 2 is a cross-section on line A–B of FIG. 1 as well as a plan view of a portion of that transport element;

FIG. 3 is a cross-section on line C–D;

FIG. 4 is a cross-section on line E–F of FIG. 2;

Figures 5, 6:
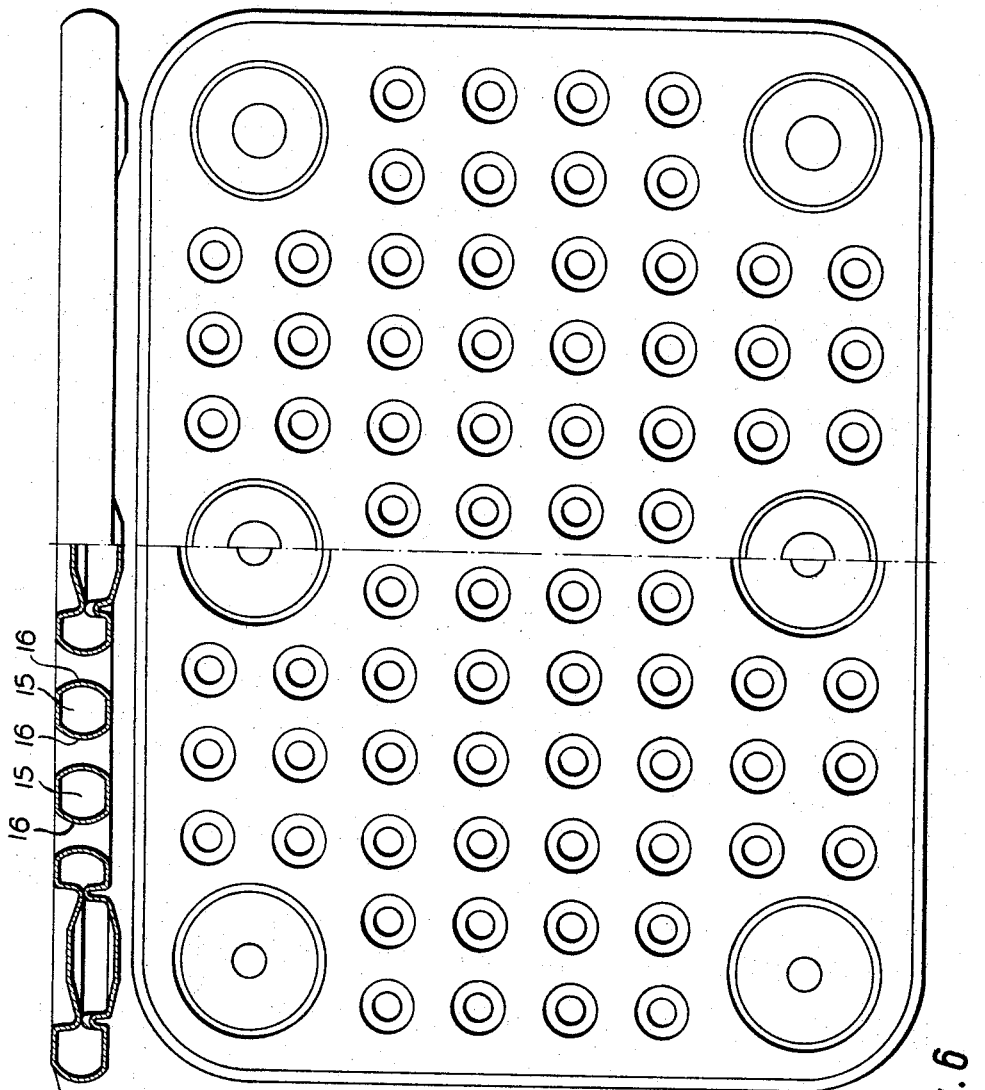
FIG. 5 is an elevation view partially in cross-section of an upper or lower plate member for a transport element which is made in one piece out of plastic by the blowing process.
FIG. 6 is a plan view of the subject of FIG. 5.

The transport element 1 according to the invention consists, especially as shown in FIGS. 1 and 3, of an upper layer or plate member 2 and a lower layer or plate member 3. Each of these two layers consists of two parts which are made with a mirror-image symmetry, and which are combined preferably by welding in the plane 4. This fastening, however, can be produced just as well by screws, rivets or other appropriate methods of the prior art. The individual plate members are formed of upper and lower halves 5 and 6 joined along line 4. As shown by FIGS. 2 and 4, the outer halves 5 have recesses 7 which are of truncoconical in cross-section, and in the middle of which are hole-like openings 8 for fastening means such as screws or rivets. The recesses 7 have the special advantages that they fully receive the projecting heads of the fastening means, so that, when viewed transversely, the surface of the transport element according to the invention is completely flat. The recesses 7 are, as shown in FIG. 2, disposed according to a certain system. In particular, a possible way of fastening the two layers 2 and 3 can be seen very clearly in the cross-sectional drawing in FIG. 3. This fastening is accomplished by the fact that ribs 9 are provided, which extend from the inner layer halves 6. The ribs extend from the respective halves toward each other and meet in abutting relation along line 9a (FIG. 3). They can be screwed together by bolting 9b, or otherwise fastened together. The ribs form spacer members holding the plate members in spaced relation. For the stabilization of the fastening shown in FIG. 3, a spacing sleeve 10 is inserted so as to hold layers 2 and 3 apart. This sleeve can consist of plastic, but it may also be made of metal if desired. A metal sleeve 10 offers special protection against possible damage by the forks of fork lift trucks.

FIG. 6 shows a top view, and FIG. 5 shows a side view, the left half of the latter being a cross-section through a layer 2 of a pallet made of plastic according to the invention. As it can be seen very clearly from FIG. 5, the individual layer consists of a cell construciton which is constructed in mirror-image symmetry to the horizontal center plane. Only the connection areas, for spacer elements which serve for the fastening together of the two layers, depart from mirror-image construction. This results in asymmetrical forms of construction at the connection areas. Layer 2 in FIG. 5 is manufactured by the blowing process, and can be of one piece integral construction.

Accordingly, the invention provides a pallet comprising an upper plate member and a lower plate member formed of plastic, and spacer members are interposed between the plate members at horizontally spaced locations, holding the plate members in spaced relation. Further, means for securing the said members together are provided. Each of the plate members can be formed of numerous cells (such as cells 15 indicated in FIG. 3, and FIG. 5). These cells are defined by confronting portions of the upper and lower plate members, 5 and 6, and vertically extending ribs 16 which interconnect the peripheries of the confronting portions. Each plate member can be formed of an upper half 5 and a lower half 6, and said halves can be mirror-images of each other along a horizontal center line of the plate members over the area of the plate members between spacer members.

While the invention has been described in respect to particular embodiments thereof, these embodiments are merely representative and do not serve to define the limits of the invention.

What is claimed is:

1. Pallet comprising an upper plate member and a lower plate member formed of plastic, said pallet members being of the same construction, spacer members interposed between said plate members at horizontally spaced locations holding the plate members in spaced relation, and means securing the said members together, each of said plate members being formed of numerous cells each defined by confronting portions of the upper and lower plate members and vertically extending ribs interconnecting the peripheries of the confronting portions, each plate member comprising an upper half and a lower half, said halves being mirror images of each other along a horizontal center line of the plate member over the area of the plate members between spacer members.

2. Pallet according to claim 1, said confronting portions of the cells comprising recesses in the outwardly disposed halves of the plate members, means defining an opening through the recesses for installation of fastening means for securing the upper and lower halves together.

3. Pallet according to claim 1, said spacer members being formed by ribs extending from the respective upper and lower plate members to abutting relation with each other.

4. Pallet according to claim 3 and comprises metal sleeves disposed over the spacer members.

5. Pallet according to claim 2, said upper and lower members being blow molded, integral, one piece elements.

6. Pallet according to claim 3, said upper and lower members being blow molded, integral, one piece elements.

7. Pallet according to claim 4, said upper and lower members being blow molded, integral, one piece elements.

References Cited

UNITED STATES PATENTS

| | | | |
|---|---|---|---|
| 2,699,912 | 1/1955 | Cushman | 108—56 |
| 3,079,876 | 3/1963 | Doane | 108—56 |
| 3,106,174 | 10/1963 | Newton | 108—54 X |
| 3,159,115 | 1/1964 | Nolan | 108—58 X |
| 3,187,689 | 6/1965 | Hess | 108—58 |
| 3,187,691 | 6/1965 | Leitzel | 108—58 |

FOREIGN PATENTS 1,364,793  5/1964  France.

DAVID J. WILLIAMOWSKY, *Primary Examiner.*

FRANK B. SHERRY, *Examiner.*

G. O. FINCH, *Assistant Examiner.*